US005287676A

United States Patent [19]

Erbse et al.

[11] Patent Number: 5,287,676

[45] Date of Patent: Feb. 22, 1994

[54] DEVICE FOR HANDLING RADIOACTIVE WASTE

[75] Inventors: Dietmar Erbse, Rodenbach; Reinhard Thiele, Frankfurt; Helmut Walter, Offenbach, all of Fed. Rep. of Germany

[73] Assignee: Siemens Aktiengesellschaft, Munich, Fed. Rep. of Germany

[21] Appl. No.: 6,477

[22] Filed: Jan. 21, 1993

Related U.S. Application Data

[63] Continuation at PCT/DE91/00347, Apr. 25, 1991

[30] Foreign Application Priority Data

Jul. 20, 1990 [DE] Fed. Rep. of Germany ....... 4023163

[51] Int. Cl.[5] .......................... G21F 9/08; B60V 1/06

[52] U.S. Cl. ........................................ 53/127; 53/249; 53/284.5; 414/146; 414/676

[58] Field of Search ...................... 53/127, 444, 266.1, 53/284.5, 251, 250, 249; 422/903; 414/146, 676

[56] References Cited

U.S. PATENT DOCUMENTS

| | | | |
|---|---|---|---|
| 3,137,397 | 6/1964 | Nicoll et al. | 414/146 X |
| 3,972,420 | 8/1973 | Stock et al. | |
| 4,050,638 | 9/1977 | Ito et al. | 414/146 X |
| 4,151,983 | 5/1979 | Stock et al. | |
| 4,196,225 | 4/1980 | Mencacci | 53/127 X |
| 4,567,957 | 2/1986 | Johnson | 414/676 X |
| 4,772,176 | 9/1988 | Montgomery | 414/676 X |
| 4,896,610 | 1/1990 | Denne | 414/676 X |

FOREIGN PATENT DOCUMENTS 3200331 7/1987 Fed. Rep. of Germany .

OTHER PUBLICATIONS

International Search Report.

*Primary Examiner*—James F. Coan

*Attorney, Agent, or Firm*—Herbert L. Lerner; Laurence A. Greenberg

[57] ABSTRACT

A device for handling liquid radioactive waste includes a heater for heating and drying liquid radioactive waste being poured into a container. A pallet, which is preferably formed of metal, receives the container. A ground vehicle transports the pallet. A supplementary heater is part of the pallet.

15 Claims, 1 Drawing Sheet

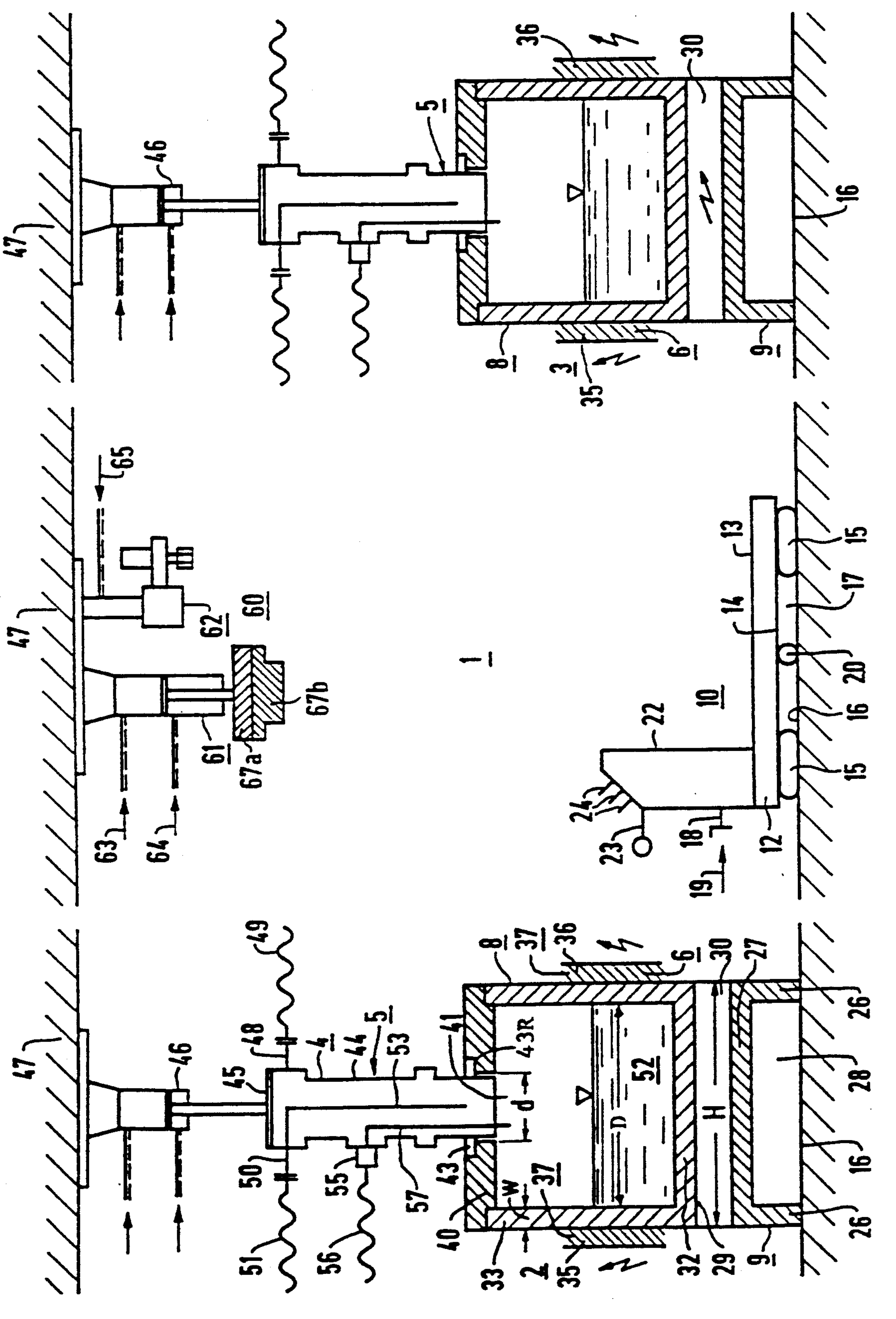

DEVICE FOR HANDLING RADIOACTIVE WASTE

CROSS-REFERENCE TO RELATED APPLICATION

This application is a Continuation of International Application Serial No. PCT/DE91/00347, filed Apr. 25, 1991.

The invention relates to a device for handling liquid radioactive waste that is poured into a container and heated there for drying.

Such a device is known from German Patent DE 32 00 331 C2, corresponding to U.S. Pat. No. 4,626,414, for example. However, those publications completely fail to address the way in which the electrical heating devices are constructed. Transportation of the containers is likewise not taken into account in the diagrammatic drawing seen therein.

It is accordingly an object of the invention to provide a device for handling radioactive waste, which overcomes the hereinafore-mentioned disadvantages of the heretofore-known devices of this general type and which solves the problems of heating and transporting the container. Handling of the container should be especially simple in view of radiation exposure, without making the expenditure for the device overly high.

With the foregoing and other objects in view there is provided, in accordance with the invention, a device for handling liquid radioactive waste, comprising a main heater for heating and drying liquid radioactive waste being poured into a container; a pallet, which is preferably formed of metal, for receiving the container; a ground vehicle for transporting the pallet; and a supplementary heater being part of the pallet. In particular, a shielded container or a final disposal container is used.

Through the use of the invention, it is possible to dispense with one operation. At least the loading and unloading of a transport device at some point provided for heating is dispensed with. Moreover, the invention can be advantageously further developed in manifold ways, as will be described in detail below.

In accordance with another feature of the invention, the ground vehicle is a hovercraft transporter, for example. As is well known, this is a vehicle that slides above the ground on a layer of air. The hovercraft transporter is driven over the ground with a compressed-air-actuated friction wheel and thus can be moved to all sides. This accordingly makes it possible to maneuver within minimal space.

In accordance with a further feature of the invention, the hovercraft is driven with externally generated compressed air. The compressed air is then delivered through a hose that is flexible enough not to impair mobility.

In accordance with an added feature of the invention, the hovercraft has an operating panel so that it is simple to control on site. An electrical vehicle, such as a rail-driven vehicle, may also be used instead.

In accordance with an additional feature of the invention, the supplemental heater on the pallet is provided for the bottom of the container, while a standard heater can be applied, for instance with a movable heating mantle, on the side wall of the container.

In accordance with yet another feature of the invention, the heating mantle has two shells that are pivotable in a horizontal plane, because this makes it easy to apply the heating mantle. This is particularly true for the case where the shells are incorporated in a drying station in such a way that the pallet fits between the swiveled-open shells. They can then be taken directly to the correct location with the ground vehicle.

A stationary installation makes the heater part of a drying station. In accordance with yet a further feature of the invention, two drying stations are disposed next to one another with associated pallets in the drying stations and are served by the same ground vehicle. Major processing capacity is thus attained at little expense.

In accordance with yet an added feature of the invention, the drying station has a filling adapter that can be inserted into the lid of the container, to save one further transport operation.

In accordance with yet an additional feature of the invention, the filling adapter includes an inlet tube, a fill level gauge, and a suction device for vapors, because this combines the essential functions necessary for a drying operation into one. The drying can be prepared for with a single connection procedure.

In accordance with again another feature of the invention, there is provided a drive for transporting lids or parts of lids, and a motor-actuatable screwing apparatus associated with the drive, for sealing the shielded container.

In accordance with again a further feature of the invention, the drive and the screwing apparatus are actuatable with the same driving energy, preferably compressed air.

In accordance with a concomitant feature of the invention, the drive is an actuating drive.

Another feature of the invention is that for sealing the container, an actuating drive is provided for transporting lids or lid parts, and that a motor-actuated screwing device is associated with the actuating drive. It is recommended that the actuating drive and the screwing device be actuated with the same driving energy, such as compressed air.

Other features which are considered as characteristic for the invention are set forth in the appended claims.

Although the invention is illustrated and described herein as embodied in a device for handling radioactive waste, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with accompanying drawing.

The drawing is a simplified, partly sectional, side-elevational view of a device according to the invention.

Referring now to the single FIGURE of the drawing in detail, there is seen a device 1 that is used for in-drum drying of liquid radioactive waste of the kind produced in a nuclear power plant with a pressurized or boiling water reactor, for example. Above all, the waste is residue from a system for treating radioactive waste water, namely so-called evaporator concentrates, which primarily are formed of water-soluble salts, such as boric acid salts. The waste may also involve suspensions and slurries of filter resins or the like.

By way of example, the drive 1 includes two drying stations 2 and 3, which are disposed next to one another in a building, only parts of which are shown, and each of which has a filling adapter 5 and a main heater 6. The drying stations are charged with identical barrels or shielded containers 8, which sit on transport pallets 9. The device 1 includes at least one ground vehicle in the form of a hovercraft transporter 10, by way of example, that is used for transporting the pallets 9. Instead, some other transport device may also be used, such as an electrically driven device including a rail vehicle, for instance.

The hovercraft transporter 10 has a base body 12 with a horizontal loading surface 13. Extending around an edge of a lower surface or underside 14 of the base body 12 is an annular hose 15, which defines at least one air cushion or air chamber 17 along with a building floor 16. If the air chamber 17 is filled with externally generated compressed air from a compressed air connection 18, as is indicated by an arrow 19, then the base body 12 is lifted. The base body 12 is then easily movable to all sides with a friction wheel 20, which is in contact with the floor 16 and is actuated by a non-illustrated compressed air motor. Through the use of the friction wheel 20, the hovercraft transporter 10 can also be safely braked.

The compressed air connection 18 leads into an operating panel 22, which is either mounted on one end surface on the base body 12 or is constructed with lengthened hoses as a panel for remote control. Through the use of diagrammatically indicated hand grips 23 and switches 24 of the operating panel 22, for instance, a drive of the friction wheel 20, including its steering, is controlled. These means are also used to adjust the pressure in the air chamber 17 and/or in the hose 15. In this way, the height of the loading surface 13 for picking up and setting down the pallets 9, is regulated.

Each transport pallet 9 is preferably made of metal. By way of example, a pallet 9 may be produced as a cast piece of lightweight metal or iron. The pallet 9 can also be made as a welded structure of steel shells. The pallet 9 has feet 26 which are located on both sides of a pallet bottom 27, forming an intermediate space or clearance 28. The hovercraft transporter 10 can move into this intermediate space 28 with its base body 12. Each pallet 9 has a top 29 which is formed by a supplementary or ground heater 30 in the pallet 9. The associated shielded container 8 is located on the top 29. In the exemplary embodiment, an electric supplementary heater 30 is indicated. However, steam could also be used as the heating energy, for example.

The shielded container 8 is preferably made of cast iron. The shielded container 8 is constructed in one piece and has a bottom 32 and a preferably cylindrical, relatively thick side wall 33 having a wall thickness w of 150 or 200 mm, for example. This wall thickness w is sufficient for adequate shielding against the escape of radioactive radiation. The container may be a final disposal container of the horizontal type having dimensions that meet official regulations. The electric heater 6 rests on the side wall 33, once its two shells 35 and 36, which are secured to the applicable drying station 2 or 3 in such a way that they are swivelable in a horizontal plane, have been folded together to form a heating mantle 37 that largely encloses the shielded container 8. In an open position, a space between the shells 35 and 36 covers a distance that is greater than the outside diameter of the shielded container 8 and the width of the pallet 9, so that the shielded container 8 and the pallet 9 fit between them and can be driven directly into that space. The heater 6 is preferably an electrical resistance heater although infrared heating may also be used.

A lid 40 of the shielded container 8 may also preferably be made of cast iron. In operation, the lid 40 is secured to the shielded container 8. The lid 40 has a central opening 41 formed therein with a circular cross section and a diameter d which is a small fraction (such as 1/10) of an inside diameter $D=H-2w$ of the shielded container 8, where H is the outside diameter of the shielded container 8. The filling adapter 5 has a fitting cross section which protrudes into the opening 41. The filling adapter 5 has a flange 43 which fits on the lid 40 in a fitting recess 43R.

The filling adapter 5 has an external housing 4 in the form of a tube 44 with a vertical axis, which is sealed with a sealing lid 45 on its upper end and is vertically adjustably secured to a compressed air drive 46, for example. The compressed air drive 46 is assigned to the applicable drying station 2 or 3 and is secured to the building ceiling, for instance, or to a stage 47. An electric drive with a lifting spindle may be used instead of the compressed air drive 46.

The tube 44 is a first part of a suction apparatus for vapors that occur during drying and concentration and that are vented to a non-illustrated condenser through a lateral connection 48 with a hose connection 49. Diagonally opposite the connection 48 is a connection 50, to which a hose 51 is secured as part of a charging line. On one hand the line 51 serves for controlled venting of the shielded container 8 during drying of the container contents or in other words of radioactive waste 52. On the other hand, the liquid radioactive waste 52 to be dried is delivered through the charging line 51 and then reaches the inside of the shielded container 8 through an inlet tube 53 that preferably extends in the center of the tube 44, without touching the inner wall of the housing 4.

A further connection 55 with a hose 56 is provided on the housing 4 at, above, or below the connection 50 and leads to a non-illustrated compressed air source. The compressed air acts upon a fill level gauge 57 in the filling adapter 5 that operates by the dynamic pressure measuring principle. Measurement is carried out only during filling of the shielded container 8. During drying, a negative pressure, for example of 0.2 bar absolute, is generated by the suction apparatus 44, 48, 49. The level gauge 57 may, for example, include a vibration sensor that serves the purpose of maximum shutoff.

The shielded container 8 is filled or refilled in increments. Once filling is complete, when the contents 52 have been dried, the filling adapter 5 is removed upward from the lid 40, so that the shielded container 8 can be taken by the hovercraft transporter 10 to a manipulator or a sealing station 60. The sealing station 60 includes a plug installer 61 and a screwing tool 62, which are secured next to one another on the building ceiling or stage 47. The plug installer 61 and the screwing tool 62 are both actuated by compressed air, for example, as is indicated by arrows 63, 64 and 65. Instead, an electrical drive may be used. The plug installer 61 has a piston drive and executes a vertical motion with which a plug **67*b* that is detachably secured to a lifting element 67*a*, is inserted into the opening 41 of the lid 40. This plug 67*b* has a T-shaped cross section. The plug 67*b* is secured in place with the aid of the screwing tool 62, producing a package that is appropriate for final disposal and is then taken to a non-illustrated transfer station by the hovercraft transporter 10**. The package is removed from the transfer station to a temporary or final disposal site.

The plug *67b* can also be removed from the opening 41 in the lid 40 at the beginning of the filling process through the use of the plug installer 61. The plug *67b* is screwed in or put in place in such a way that it is flush with the surface both at the top and at the bottom. The filling adapter 5 can be structurally combined with the installer 61 and/or the screwing tool 62.

The exemplary embodiment shows that the invention leads to a compact device 1 with which liquid radioactive waste can be packaged so as to be suitable for final disposal, in a few operations and with correspondingly little radiation exposure. In summary, the exemplary embodiment can be characterized as follows:

The shielded container 8 is joined to the adapter 5, which in itself combines the inlet, vapor vent and fill level gauge. The heating energy required for the evaporation is supplied through the electrical resistance heater 6 that is to be applied to the shielded container 8 from the outside, and the floor heater 30 that is located in the transport pallet 9. The pallet is moved together with the shielded container 8, for instance independently of rails, by means of the hovercraft transporter 10. Only one compressed air connection 18 is required for producing the air film and for driving the friction wheel 20. The associated operating panel 22 is transportable. This makes it simple to reach filling, sealing and transfer positions.

We claim:

1. A device for handling liquid radioactive waste, comprising:

a main heater for heating and drying liquid radioactive waste being poured into a container;

a pallet for receiving the container;

a ground vehicle for transporting said pallet; and a supplementary heater being part of said pallet.

2. The device according to claim 1, wherein said pallet is formed of metal.

3. The device according to claim 1, wherein said ground vehicle is a hovercraft transporter having a compressed-air-actuated friction wheel for moving said hovercraft transporter along a floor.

4. The device according to claim 3, including means for driving said hovercraft transporter with externally generated compressed air.

5. The device according to claim 3, wherein said hovercraft transporter has an operating panel.

6. The device according to claim 4, wherein said hovercraft transporter has an operating panel.

7. The device according to claim 1, wherein said supplementary heater is disposed on said pallet for heating a bottom of the container, and said main heater has a movable heating mantle to be applied to a side wall of the container.

8. The device according to claim 7, including a drying station, said heating mantle having two shells being movable in a horizontal plane and being mounted in said drying station for fitting said pallet between said shells in a swiveled-open position of said shells.

9. The device according to claim 1, including two drying stations being disposed next to one another, and another pallet, each of said pallets being disposed at a respective one of said drying stations and being served by said ground vehicle.

10. The device according to claim 1, including a drying station having a filling adapter to be mounted at an opening in a lid of the container.

11. The device according to claim 10, wherein said filling adapter includes an inlet tube, a fill level gauge, and a suction apparatus for vapors.

12. The device according to claim 1, including a drive for transporting at least parts of lids, and a motor-actuatable screwing apparatus associated with said drive, for sealing the container.

13. The device according to claim 12, wherein said drive and said screwing apparatus are actuatable with the same driving energy.

14. The device according to claim 12, wherein said drive and said screwing apparatus are actuatable with compressed air.

15. The device according to claim 12, wherein said drive is an actuating drive.

* * * * *